United States Patent [19]

Comperatore et al.

[11] 4,233,050

[45] Nov. 11, 1980

[54] SHAPING GLASS SHEETS BY GRAVITY SAG BENDING FOLLOWED BY BLOW FORMING

[75] Inventors: John A. Comperatore, Natrona Heights; David J. Wise, New Kensington; Edward D. Black, Brackenridge, all of Pa.

[73] Assignee: PPG Industries, Inc., Pittsburgh, Pa.

[21] Appl. No.: 18,964

[22] Filed: Mar. 9, 1979

[51] Int. Cl.² ............................................. C03B 23/02
[52] U.S. Cl. ......................................... 65/107; 65/104
[58] Field of Search ........................... 65/104, 106, 107

[56] References Cited

U.S. PATENT DOCUMENTS

| | | | |
|---|---|---|---|
| 637,899 | 11/1899 | Sievert | 65/106 |
| 3,459,521 | 8/1969 | Nedelec | 65/104 |
| 3,473,909 | 10/1969 | Bennett et al. | 65/106 X |
| 3,484,225 | 12/1969 | Bognar | 65/104 X |
| 3,600,150 | 8/1971 | Rougeux | 65/104 X |

Primary Examiner—Arthur D. Kellogg
Attorney, Agent, or Firm—Dennis G. Millman; Edward I. Mates

[57] ABSTRACT

This invention covers shaping glass sheets to complicated shape by first preliminarily shaping said sheets to a prebent shape while supported on an outline mold, then completing the shape while cradling the prebent sheets within a thin flexible blanket of fiber glass cloth during final shaping by blow forming. This invention also covers a technique of cradling glass sheets in a flexible fiber glass blanket that is wrapped over the margin of the glass sheets to be shaped by blow forming. The margin of the blanket is reversely wrapped over a frame-like ring that prevents the marginal edge from curling and maintains the cradle in tension against the lower major surface of the glass sheet during shaping by blow forming.

9 Claims, 10 Drawing Figures

SEQUENCE OF OPERATIONAL STEPS

1. MOUNT FLAT GLASS SHEETS ON OUTLINE MOLD.

2. INSERT MOLD IN KILN.

3. CONNECT THE ELECTRICAL CONNECTIONS TO THE CREASE HEATER.

4. HEAT THE KILN TO SUBSTANTIALLY UNIFORM TEMPERATURE.

5. APPLY VOLTAGE TO CREASE HEATER TO PREBEND GLASS.

6. REMOVE MOLD FROM KILN.

7. REMOVE PREBENT GLASS FROM MOLD.

8. CRADLE PREBENT GLASS IN FIBERGLASS CLOTH TO FORM ASSEMBLY.

9. MOUNT RING OVER PREBENT GLASS-FIBERGLASS CLOTH ASSEMBLY.

10. WRAP PERIPHERY OF FIBERGLASS CLOTH OVER RING TO FORM RING ASSEMBLY.

FIG. 9A.

SEQUENCE OF OPERATIONAL STEPS - CONTINUED

11. POSITION RING ASSEMBLY OVER SHAPING SURFACE OF BLOW-FORMING TOOL.

12. POSITION BLOW-FORMING TOOL IN KILN.

13. APPLY HEAT TO KILN TO HEAT GLASS TO DEFORMATION TEMPERATURE.

14. LOWER ROOF OF BLOW-FORMING TOOL TO FORM SEALED CHAMBER.

15. APPLY HOT PRESSURIZED AIR TO SEALED CHAMBER FOR LIMITED TIME WITHIN HEATED KILN.

16. RAISE ROOF WHEN SAGGED GLASS REACHES BOTTOM OF SURFACE OF BLOW-FORMING TOOL.

17. REMOVE BLOW-FORMING TOOL FROM KILN.

18. REMOVE BENT GLASS FROM BLOW-FORMING TOOL.

FIG. 9B.

SHAPING GLASS SHEETS BY GRAVITY SAG BENDING FOLLOWED BY BLOW FORMING

BACKGROUND OF THE INVENTION

1. Field of the Invention

This invention relates to a method of shaping at least two glass sheets to a complicated shape using gravity sag bending to produce a relatively simple prebent shape followed by blow forming to change the relatively simple prebent shape into a more complicated final shape. A typical shape produced by the present invention is found in the complicated window shapes for a Cessna 421 airplane. However, while the present invention was designed especially for producing an aircraft windshield, it is equally well suited for the production of other transparent articles.

Glass sheets have been shaped while heated to a deformation temperature by various methods. These include gravity sag bending in which one or more glass sheets are permitted to sag until their lower surface conforms to the upward facing surface of a mold of desired contour. Another known method involves press bending wherein a glass sheet is sandwiched in pressurized engagement between a pair of press bending molds of complementary contour. Usually, the molds are covered by a material that reduces the marking on the hot glass. Fiber glass cloth is a well-known material for this purpose. Both of the press bending molds between which glass is sandwiched during press bending may be rigidly formed. However, it is also known to shape glass sheets between a flexible member and a rigid member. It is also known to shape or reshape glass sheets by applying pressure through a fluid against a flexible member that presses a heat-softened glass sheet against a rigid mold having a shaping surface of the desired shape.

In gravity sag bending, glass sheets are shaped to conform either at their outlines only or to conform throughout their entire extent to the shape of an upward facing shaping surface of the gravity sag mold. When dirt particles are present on the upper shaping surface of a continuous shaping mold, the surface of the glass is marred. When a glass sheet is sag bent to conform to the shape of an outline mold, it is difficult to control the intermediate sag bounded by the marginal portion that conforms to the shape of the shaping surface of an outline mold.

When pressure is applied to help form a glass sheet, any deviations from surface smoothness on the press forming mold are replicated in the heat-softened surface of the glass sheet undergoing shaping. The presence of a parting material or cover for the press bending molds reduces the severity of surface marking due to pressure of a solid member against a heat-softened glass sheet surface. However, such surface markings are difficult to remove altogether.

When glass sheets are cradled between a flexible hammock of fiber glass cloth and the covered shaping surfaces of press bending molds, it is necessary to spring load the flexible fiber glass material so as to avoid marking the heat-softened glass sheet surfaces with wrinkles formed on the fiber glass material contacting the glass.

It has also been proposed to use pressure forming as a means of shaping glass sheets. When glass sheets are shaped by pressure of a fluid applied through a flexible member against one surface of a glass sheet to bring the opposite surface of a glass sheet against a shaping surface of a solid mold, it is still difficult to avoid entirely replicating the defects on the solid mold on the surface of the sheet that contacts or is brought into pressurized engagement against the pressing mold.

Glass sheets have also been shaped by blow forming. However, during blow forming, the thickness of the glass sheet that results from such shaping is nonuniform and the degree of nonuniformity varies considerably with the size of the sheet and the degree of curvature to which the sheet is to be shaped.

2. Description of the Prior Art

U.S. Pat. No. 2,123,552 to Helwig discloses the blow forming of plastic sheeting against a so-called negative mold having a three dimensional curved surface allegedly without marring the surface of the sheet undergoing shaping. The plastic sheet is blown against a mold having a convex shaping surface by the application of fluid pressure. When the fluid pressure exceeds a predetermined amount, which is associated with the completion of the shaping, the pressure lifts the mold. This actuates a solenoid valve circuit which stops the application of pressure so as to produce a shaped plastic sheet that does not come into contact with the mold shaping surface and which, as a consequence, has optically clear surfaces.

U.S. Pat. No. 2,218,654 to Paddock discloses a two-step method for shaping glass sheets to deep bends. The first step is an over bend where the glass, while supported on pipes between its ends and on additional pipes at its ends is heated to a glass softening temperature. The end supporting pipes are removed to permit the glass sheet to sag into a convexly elevated shape. The glass sheet is then turned upside-down and shaped additionally by gravity sagging through the application of heat while the upside-down glass sheet is supported over a bending mold having a shaping surface of concave elevation.

U.S. Pat. No. 2,377,849 to Binkert and Jendrisak discloses a process of bending a stack of glass sheets by prebending them by gravity to conform to the shape of a first mold followed by shaping the glass sheets by a combination of gravity and suction to conform to a second mold of compound curvature.

U.S. Pat. No. 2,518,896 to Jendrisak discloses a technique of bending a pair of glass sheets supported in an oblique orientation over an outline shaping mold. A pivotable frame member of complemental shape rests on the upper shaping surface of the glass sheet when the latter is heat-softened to pressure form the glass to a shape conforming to that of the upwardly facing outline shaping surface of the mold beneath the glass sheet.

U.S. Pat. No. 3,473,909 to Bennett, Blanding and Hausheer discloses a method of correcting distortions in the shaping of glass articles such as spherical glass lenses or television tube or cathode ray tube face plates by supporting a sheet that has become distorted during its original shaping by applying pressure through a stretched membrane against the upper surface of the glass article to conform the shape of its lower surface to an upward facing surface of the mold that supports the lower surface of the glass article when pressure is applied through the flexible stretched membrane.

U.S. Pat. No. 3,484,225 to Bognar reforms the inner surface of a cathode ray tube having phosphors applied thereto by heating a deformed or distorted cathode ray tube in an oven to a temperature equal to the softening point at its outer layer and equal to its annealing point at its inner layer, applying pressure through a flexible member and a tautly held heat shield member against the upper surface of the cathode ray tube while the lower surface of the cathode ray tube is pressed against the upper shaping surface of a heated mold.

U.S. Pat. No. 3,600,150 to Rougeux uses a flexible hammock that is spring loaded to support a glass sheet between upper and lower shaping surfaces of complementary curvature whose glass facing surfaces are covered. This patent also discloses the concept of enlosing a vertically suspended glass sheet in a flexible fiber glass sling and shaping the heat-softened glass sheet together with the sling between a pair of press forming members.

In forming complicated bends to conform to the shape required for certain aircraft windshields, or to form glass shaping plates which are used to press polish and simultaneously laminate plastic windows for aircraft of the type having an outer sheet of acrylic plastic or polycarbonate plastic, where it is desirable that the glass sheets used for such pressing be smoothly shaped and of exact confirmation in shape to one another, it is necessary to avoid any marring of the glass and that the glass be formed by a precision forming process at as close to the required shape throughout its entire extent as possible. It is also desirable to minimize the deviation in thickness that accompanies blow forming and still obtain shape conformity to desired complex shapes with minimum surface marking. This precision shaping must be performed at a minimum temperature possible using a low melting glass composition that devitrifies at a temperature slightly above its annealing range. Hence, it is necessary to develop a technique that combines the best features of several prior art glass sheet shaping methods in a novel combination of steps that results in shaping glass sheets to a precise compound bend without devitrifying the highly devitrifiable glass composition.

SUMMARY OF THE INVENTION

The present invention provides a method of shaping at least two glass sheets simultaneously to a complicated shape using a method that provides an accurate shape conformity, minimum variation in thickness due to stretching and minimum marking. The method comprises preliminarily shaping the glass sheets to a preliminary shape by supporting said at least two glass sheets over an upward facing shaping surface of an outline shaping mold with parting material between the sheets, heating said glass sheets to the glass deformation temperature until said sheets sag to form an assembly having a prebent shape conforming to said upward facing shaping surface, cradling said assembly of prebent glass sheets in a thin flexible blanket of fiber glass cloth with the peripheral edge of the blanket wrapped over the edge of the assembly, applying a frame-like ring to the portion of said blanket wrapped over the edge of said prebent assembly to hold said blanket taut against said assembly and to form a ring assembly, positioning the ring assembly over a shaping surface of compound shape of a blow forming tool, heating the ring assembly to the glass deformation temperature while mounted over said shaping surface of said blow forming tool, enclosing said blow forming tool to form a sealed chamber containing said ring assembly and pressurizing said sealed chamber at said deformation temperature until said glass sheets conform to said shaping surface of said blow forming tool.

The benefit of the present invention is that the glass is permitted to sag freely to its preliminary shape while supported around its peripheral margin on the outline mold and the amount of blow forming that is needed to complete its complicated shape is minimal so as to minimize the variation in thickness that results from blow forming the glass from the initial flat configuration to its final configuration.

The present invention also involves blow forming a plurality of glass sheets supported on a flexible cradle of fiber glass cloth that is wrapped around the margin of the glass sheets and reversely wrapped about a frame-like ring that rests on the upper surface of the reversely wrapped margin to bear down on the marginal portion of the glass during blow forming.

The present invention will be understood in both its method and apparatus aspects upon a study of a description of a specific embodiment thereof which follows.

BRIEF DESCRIPTION OF THE DRAWINGS

In the drawings that form part of a description of the preferred embodiment of the present invention, and wherein like reference characters are applied to like structural elements.

FIG. 9 is a list of a sequence of operational steps performed according to a preferred mode of this invention, and consists of FIG. 9A, which lists the initial steps, and FIG. 9B, which lists a continuation of the sequence of operation steps performed in accordance with the present invention.

DESCRIPTION OF THE PREFERRED EMBODIMENT

Figure 1:
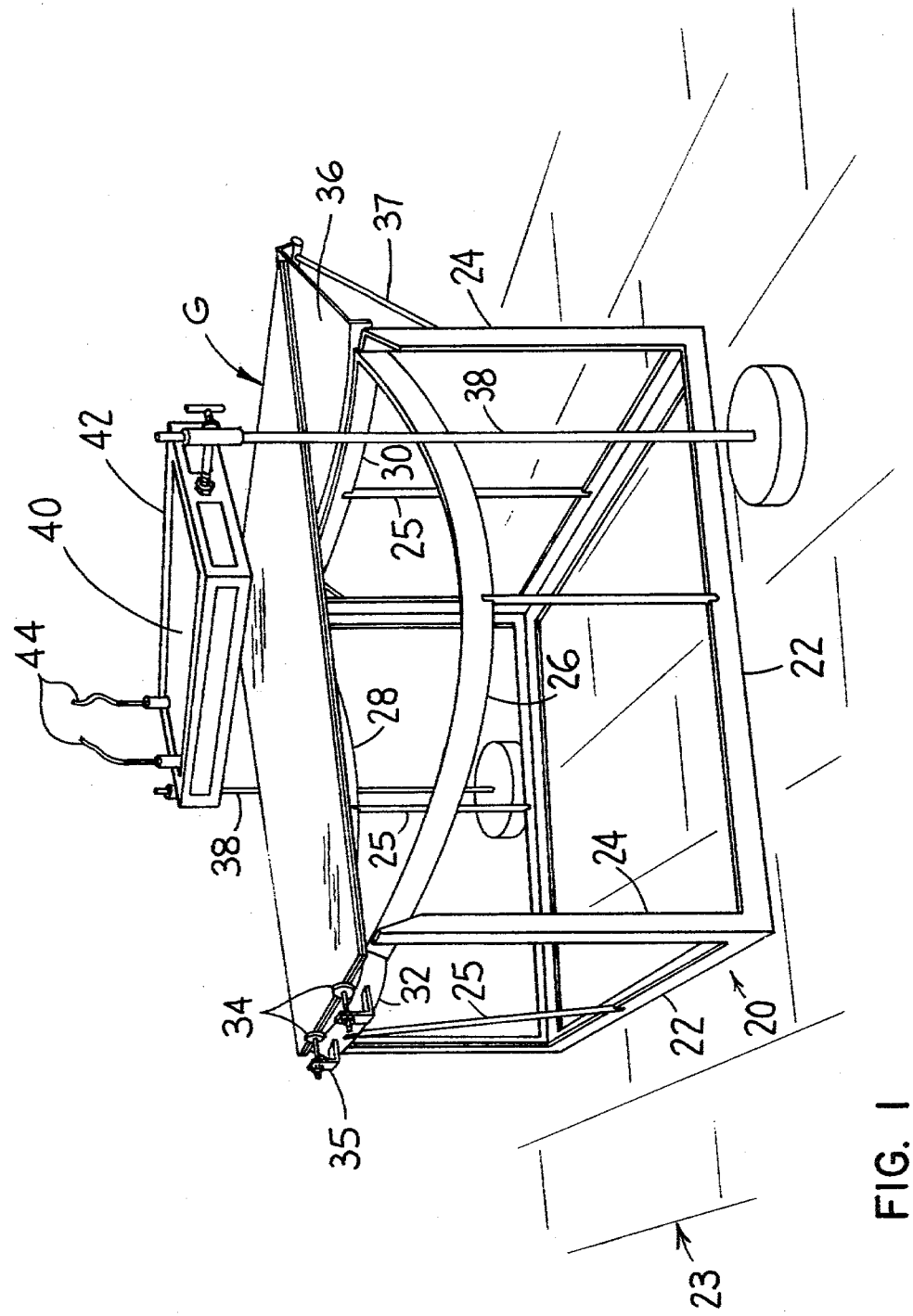
FIG. 1 is a perspective view of an outline mold used to shape at least two glass sheets simultaneously to a prebent shape.
Figure 2:
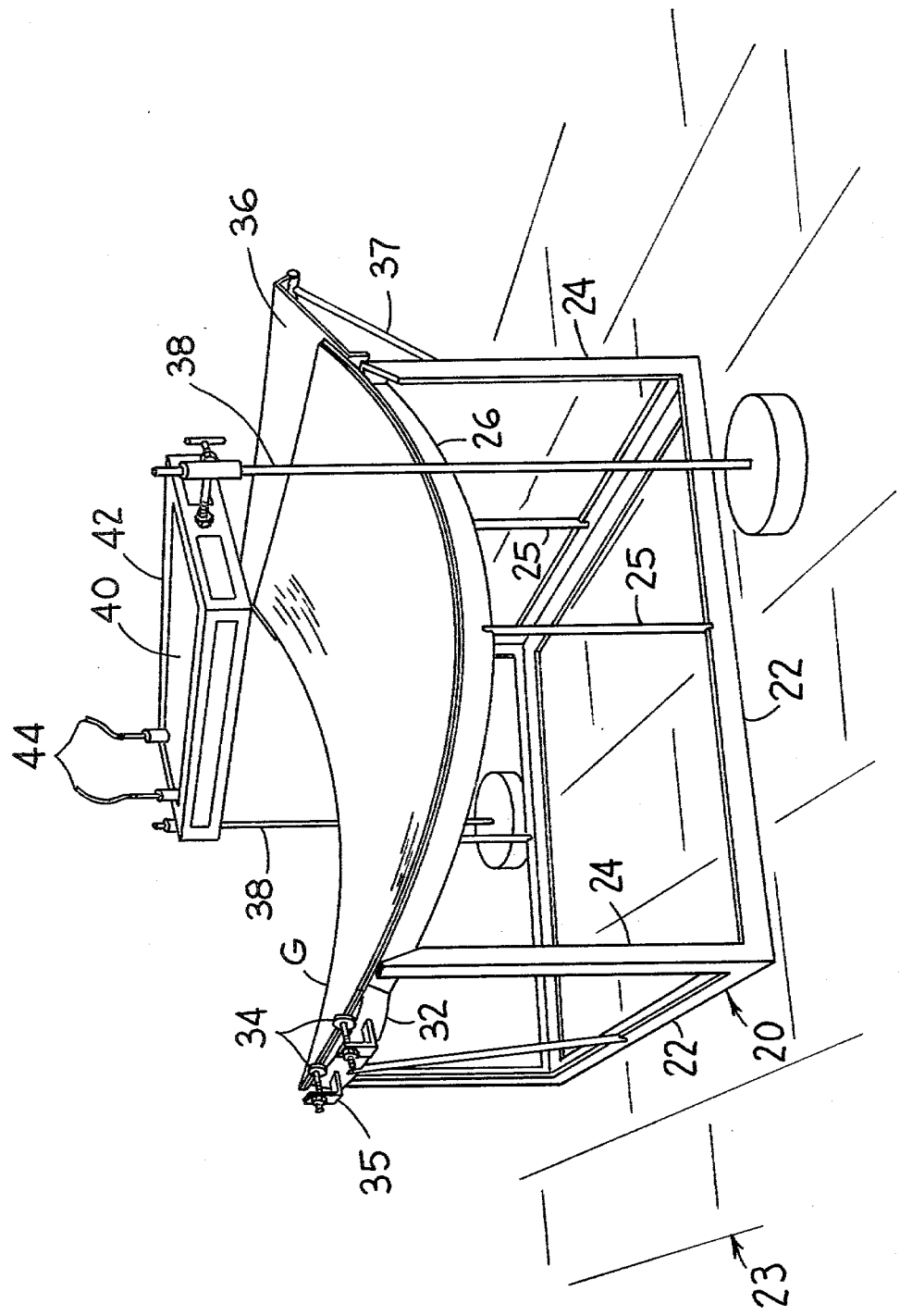
FIG. 2 is a view similar to FIG. 1 showing the glass sheet in its prebent shape.

With reference to the drawings, this specification will first describe apparatus and then a method according to the present invention using the apparatus described first. FIGS. 1 and 2 disclose an outline mold 20 comprising a plurality of horizontal mold members 22 in the form of angle irons arranged in a frame-like structure supported on ceramic blocks that rest on a carriage 23. The carriage is adapted to move within a kiln of the type depicted in FIG. 1 of U.S. Pat. No. 4,119,424 to John A. Comperatore, the description of which is incorporated herein by reference.

At each corner of the frame produced by the horizontal mold members 22, a plurality of vertical posts 24 extend upward. The upper ends of vertical posts 24 support end portions of longitudinal shaping rails 26 and 28 which are interconnected with transverse shaping rails 30 and 32. The shaping rails are composed of a rigid metal such as iron or steel. Additional intermediate support posts 25 are provided to support the shaping rails intermediate their ends in spaced relation above the horizontal mold members 22. The shaping rails are longitudinally curved and their width dimension extends vertically to provide an outline shaping surface at the upper edges of the shaping rails that conforms to the elevation and plan outline near the Perimeter of glass sheets shaped thereon.

Shaping rails 26 and 28 are parallel to one another and extend along the longitudinal side edges of an outline shaping surface. The shaping rails 30 and 32 extend between corresponding ends of the longitudinal shaping rails 26 and 28 so that the shaping rails combine to form a continuous outline shaping surface having rails disposed edgewise with the upper edge of the shaping rails forming an outline shaping surface conforming to the shape desired for the glass sheet after bending.

A pair of adjustable end stops 34 is attached by brackets 35 to the outer surface of shaping rail 32 in a position to engage an end edge of the glass sheets mounted on the outline mold for shaping. Adjacent to and extending obliquely upward from shaping rail 30 is an oblique sliding support 36. The latter is supported relative to the mold by strut supports 37. FIG. 1 shows a pair of glass sheets mounted on the outline mold 20 with one end edge of the glass resting on the oblique sliding support 36 and the other end edge against the end stops 34.

The carriage 23 also supports a pair of vertical stands 38 mounted on opposite sides of the mold 20. One of the stands 38 is located laterally outside shaping rail 26 while the other stand is located laterally outside of shaping rail 28. An electric heater 40 comprising series connected rows of resistance wires mounted in rows of 100 coils each carried within a ceramic block 42, is supported between the upper portions of the vertical stands 38. The electrical heater 40 is connected to a source of voltage through electrical lead lines 44. The electrical heater 40 is located above the glass sheets G and faces an elongated area that is desired to be bent to a relatively sharp bend compared to the remainder of the shape of the glass sheet about an axis extending transverse of the glass sheets and transverse to the lengths of shaping rails 26 and 28.

When glass sheets are mounted on the outline mold 20 supported on the carriage 23 and the latter is inserted within a kiln of the type described in the aforementioned Comperatore patent, the glass sheets are heated to their deformation temperature with additional heat being provided for a brief period from a voltage source (not shown) through the electric lead wires 44 to the electric heater 40 to impart a sharp bend in the area of the glass sheets facing the electric heater 40 while the remainder of the glass sheets sag to conform to the outline shaping surface provided by the upper surfaces of the respective mold shaping rails 26, 28, 30 and 32. The glass sheets shaped to their prebent shape by sag bending conform in their marginal portion to the outline shaping surface of the outline mold 20 depicted in FIG. 2. Since only the margin of the prebent glass sheet has contacted the rigid shaping rails, the remainder of the prebent glass is free of surface markings. If desired, glass sheets of rectangular outline can be bent to preliminary shapes and then cut to non-rectangular outline in a manner well known in the art as exemplified by U.S. Pat. No. 3,037,324 to Carson.

The glass sheets shaped by gravity sag bending have been bent to a depth of 6 inches (15.2 cm) and have become a preliminarily bent assembly that is now ready for additional shaping by blow forming according to the technique of the present invention. The manner of support and treating the glass sheets during blow forming is an important feature of the present invention that is incorporated in the overall combination of steps performed on the glass sheets.

Figure 3:
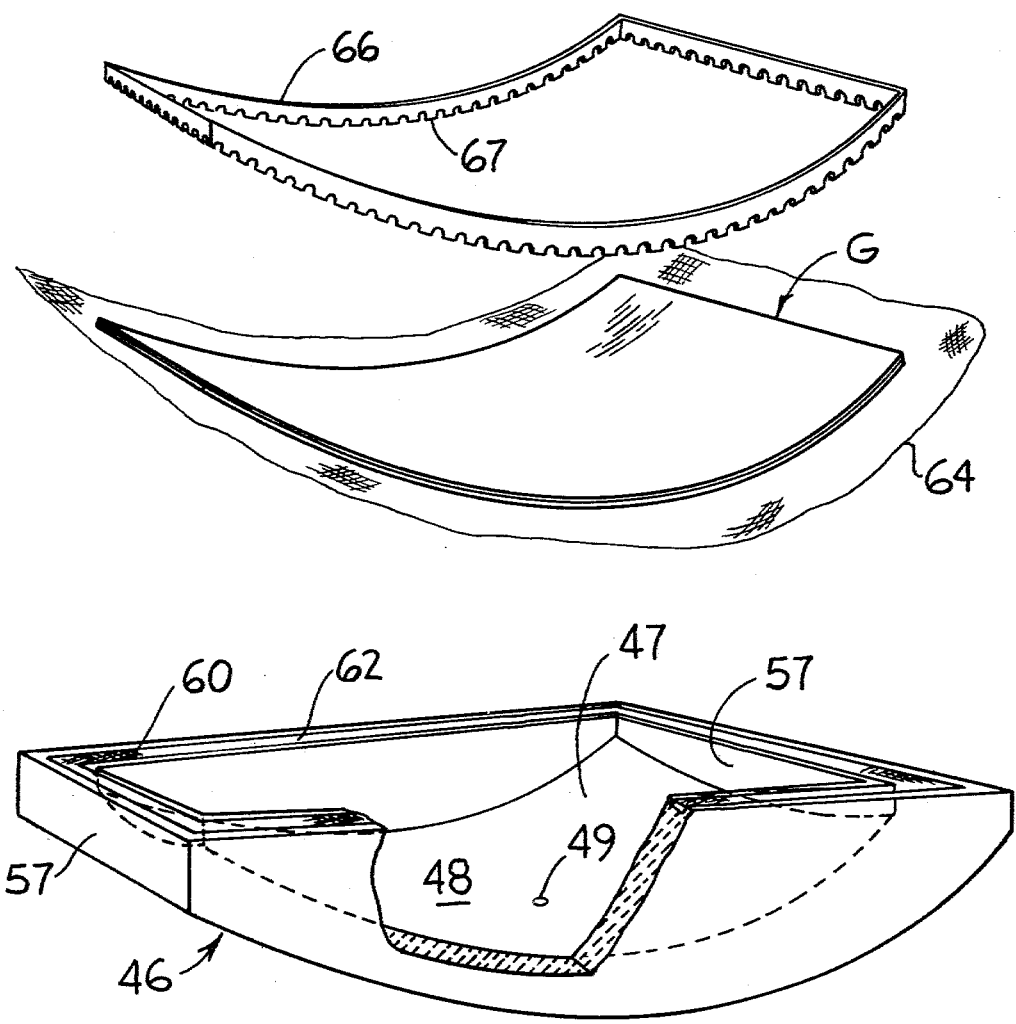
FIG. 3 is an exploded view showing the lower portion of a blow forming tool omitting its reinforcing structure, a pair of prebent glass sheets supported on a flexible blanket of fiber glass and a frame-like ring spaced above the pair of prebent glass sheets.
Figure 4:
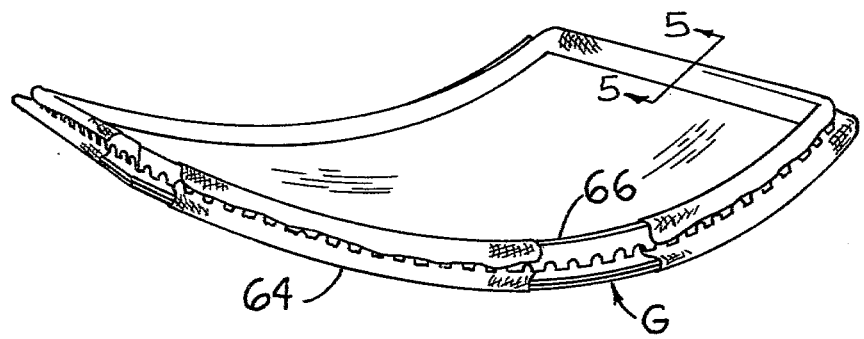
FIG. 4 is a perspective view with parts removed in part to show how a flexible blanket of fiber glass is folded over the edge of the pair of prebent glass sheets and then reversely folded over the frame-like ring of FIG. 3.
Figure 5:
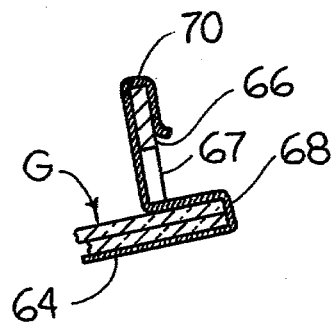
FIG. 5 is a detailed sectional view taken along the lines 5—5 of FIG. 4.

With reference to FIG. 3, a box-like element 46 of a blow forming tool of ceramic material is shown having a curved floor 47 provided with an upward facing shaping surface 48 contoured both transversely and longitudinally into the compound shape desired for the lower surface of a series of glass sheets. An aperture 49 is drilled through the thickness of the floor 47 to provide escape for air when the glass sheets sag toward the upward facing shaping surface 48 at the bottom of the blow forming tool 46.

Figure 6:
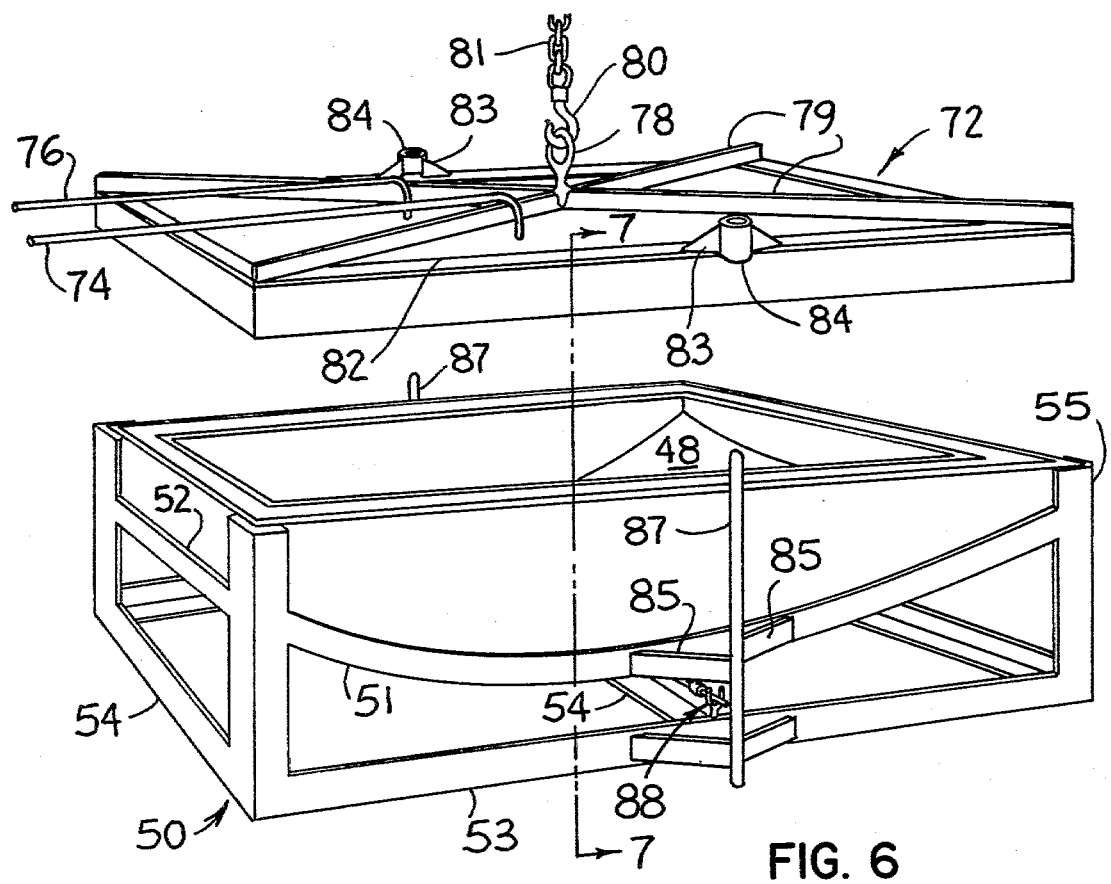
FIG. 6 is an exploded view of a blow forming tool, its reinforcing frame, and a cover therefor.

A skeleton metal frame 50 (FIG. 6) comprising a pair of curved upper members 51 interconnected by a pair of upper cross members 52, a pair of lower longitudinal members 53 interconnected by several lower cross members 54 and corner uprights 55 that reinforce the upper and lower connections help reinforce the box-like element 46 and support the latter in spaced relation over the carriage 23. The box-like element also comprises a pair of side walls 56 and a pair of end walls 57 which interconnect the ends of the side walls and the floor 47 to form a box-like structure. A gasket member 60 is inserted in a peripheral groove 62 formed along the upper edge surface of the side walls 56 and the end walls 57 to provide means for sealing the blow forming tool when a roof 72 (FIG. 6) is mounted over the box-like member 46 to provide a sealed chamber within which the blow forming operation is performed.

The preshaped glass sheets are cradled on a blanket 64 of flexible fiber glass material and a frame-like ring 66 having a contour conforming to the marginal periphery desired for the final shape of the glass is used in superimposed position over the marginal portion of the glass sheet. The frame-like ring 66 is in the form of a continuous metal rail disposed edgewise and has a serrated lower edge 67 to minimize heat exchange between the metal rail 66 and the glass sheets supported by the fiber glass cradle 64. Before the frame-like ring 66 is applied, the blanket 64 is wrapped around the margin of the prebent glass sheets to form an end fold 68. This end fold extends a short distance in over the upper surface of the assembly of preshaped glass sheets. The frame-like ring 66 is superimposed over the folded portion of the end fold 68 that extends over the upper surface of the preshaped glass sheet assembly and a reverse fold 70 is applied tightly around the frame-like ring 66 to insure that the blanket 64 stretches tightly against the lower major surface of the preliminarily heat assembly.

The assembly comprising the flexible cradle 64 of fiber glass wrapped around the assembly of prebent glass sheets to provide the end fold 68 and then the reverse fold 70 over the frame-like ring 66 will be referred to as a ring assembly. This ring assembly is mounted over the upward facing shaping surface 48 of the box-like member 46 of the blow forming tool and the cover 72 is applied over the upper edge of the box formed by the side walls 56 and the end walls 57 so that the bottom surface of the cover is in intimate contact with the peripherally extending gasket member 60 mounted in the grooved periphery 62.

The floor 47 and the walls 56 and 57 are approximately one inch (25 millimeters) thick to provide a box-like structure for the blow forming tool composed of a castable ceramic containing about 93.65% alumina and minor amounts of chrome and silica sold under the trademark of PURETAB. The roof 72 is also constructed mainly of PURETAB ceramic composition with metal reinforcements.

The cover 72 of the blow forming tool 46 is provided with a pressure line 74 for providing air under pressure into the sealed chamber that results when the roof 72 is lowered directly over the box formed by the side walls 56 and end walls 57. Also provided is a pressure gauge line 76 to determine the pressure within the blow forming tool. An eye 78 is mounted to a pair of criss-cross bracing reinforcements 79 on the roof 72 for engagement by a hook 80 fastened to the bottom of a chain 81 fastened to an overhead pulley mounted in the roof of the kiln (not shown) is provided for raising and lowering the roof 72 where needed.

In order to insure that the roof 72 is properly aligned with the box-like member 46 when lowered so that the resulting blow forming tool forms a sealed chamber, the roof 72 is provided with a metal reinforcing frame 82 that support a pair of brackets 83, each of which supports a pipe fitting 84. The skeleton frame 50 has a pair of braces 85 attached at their obliquely inner ends to each upper curved longitudinal members 51 and a pair of vertically aligned braces 86 attached at their obliquely inner ends to each lower longitudinal member 53. Each associated pair of braces 85 and 86 is secured at its outer end of a vertical bar 87. The bars 87 guide the movement of the pipe fittings 84 when the cover 72 is raised or lowered to insure proper alignment.

Figure 7:
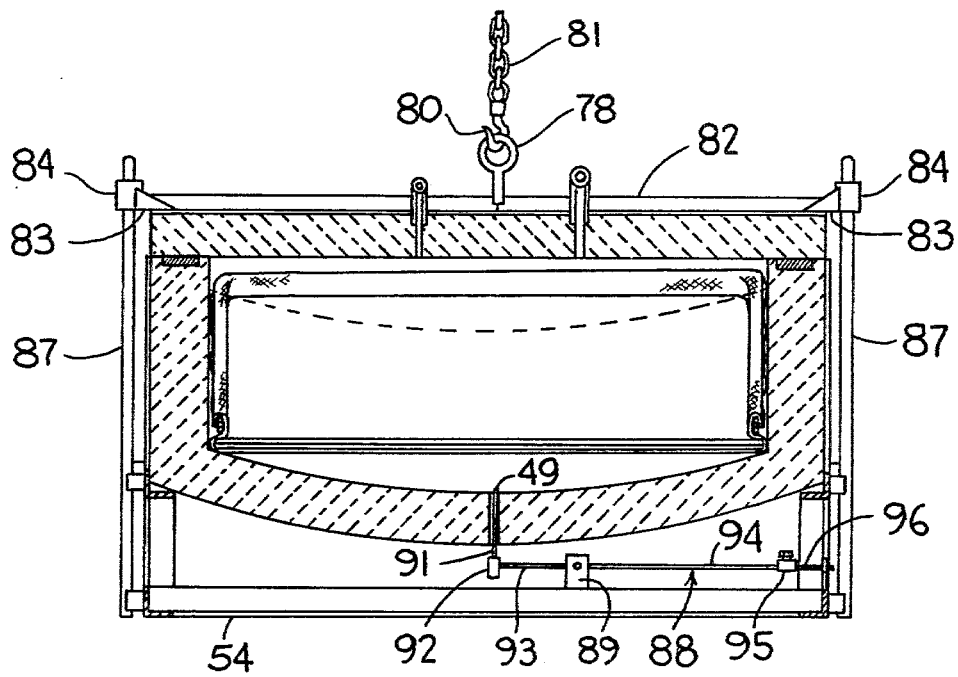
FIG. 7 is a cross-sectional view taken along the lines 7—7 of FIG. 6 modified to show the blow forming tool of FIG. 6 with its cover installed and showing a prebent glass sheet with its flexible fiber glass cradle and its frame-like ring installed therein for final shaping by blow forming.
Figure 8:
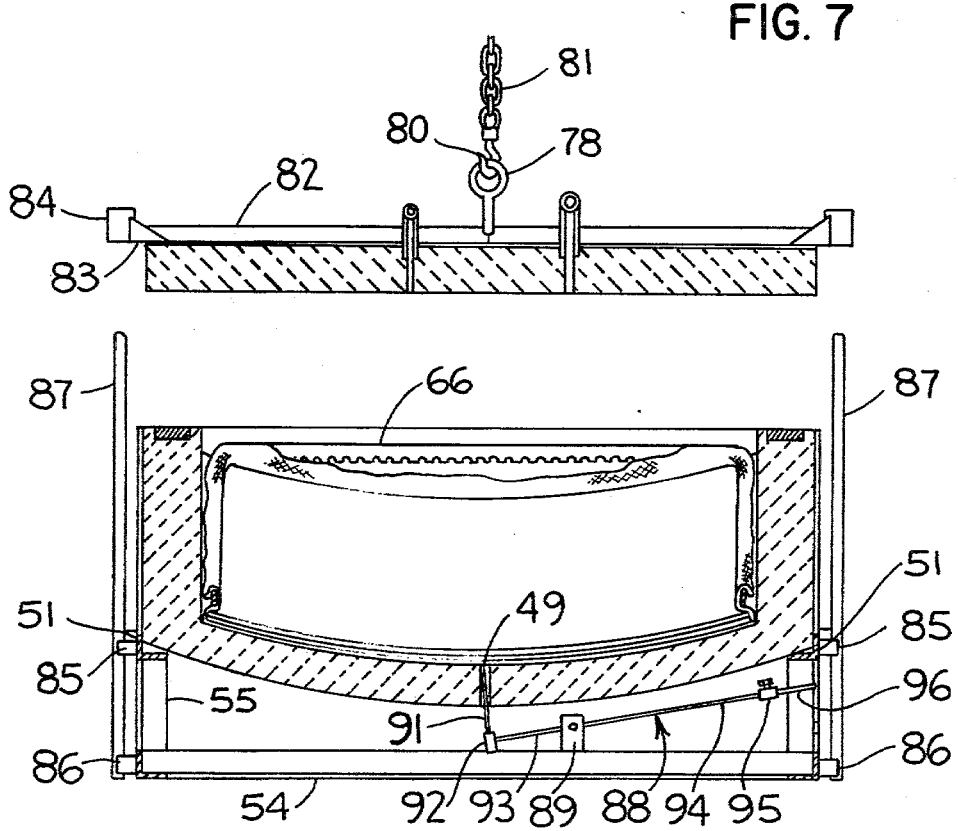
FIG. 8 is a view similar to FIG. 7 showing the glass sheets within the blow forming tool shaped to final shape and the cover for the blow forming tool removed.

A sag indicator 88 is pivotally mounted on a fulcrum 89. The latter is supported on an intermediate lower cross member 54 of the skeleton frame. A wire 91 extends upward from a bracket 92 at the inner end of an inner arm 93, while an outer arm 94 provided with a movable counterweight 95 extends to form a pointer 96 at its outer end. The position of counter-weight 95 is adjusted along outer arm 94 in such a manner that the wire 91 extends upward through aperture 49 in very slightly upwardly biased counter-weighted position when a glass sheet or glass sheet assembly G is mounted for final shaping by blow forming as depicted in FIG. 7. When the glass is shaped to assume the contour of the upper shaping surface 47, the weight of the glass is sufficient for the printer 96 to move upward to indicate that the bend is now complete.

In a typical operation, where an aircraft transparency has a depth of bend of about 6 inches (15 cm) in an overall length of 14 inches (34 cm) and comprises two sheets of shaped polycarbonate, the apparatus is used to shape two sheets of glass 42 inches (107 cm) square having a nominal thickness of 3/16 inch (4.8 millimeters). In case the transparency comprises laminated glass, three glass sheets having a nominal thickness of ⅛ inch (3.2 millimeters) are assembled for shaping according to the cycle to be described. In either case, a choice is made of a glass composition having the following ingredients:

| Ingredients | Percent by Weight |
|---|---|
| $SiO_2$ | 59–62 (preferably 62) |
| $Al_2O_3$ | 18–23 (preferably 20.1) |
| $Li_2O$ | 4–5.5 (preferably 4.8) |
| $Na_2O$ | 7–9 (preferably 7.9) |
| $B_2O_3$ | 3–5 (preferably 4.6) |
| Cl | 0.5 |
| $As_2O_5$ | 0.1 |

This preferred composition has the following properties:

| | |
|---|---|
| Liquidous temperature | 1855° F. (1013° C.) |
| Strain point (viscosity $4 \times 10^{14}$ poises) | 860° F. (460° C.) |
| Annealing point (viscosity $2.5 \times 10^{13}$ poises) | 930° F. (499° C.) |
| Log 4 viscosity temperature | 1925° F. (1053° C.) |
| Log 3.5 viscosity temperature | 2300° F. (1260° C.) |

The glass composition selected was one that had a relatively low softening point so that it would conform readily to a desired shape when subjected to a controlled heat cycle. Another reason for selecting this glass composition is that the glass composition could be chemically tempered by ion exchanging for 270 minutes in sodium nitrate at a temperature in the range of 750° to 760° F. (399° to 404° C.) The same temperature and time situation occurred when two sheets of glass of this composition to be used for press polishing plates for polycarbonate or three plies of the glass composition having a nominal thickness of ⅛ inch (3.2 millimeters) were used to be shaped as an assembly. The glass sheets 42 inches (107 centimeters) square are mounted on the outline mold 20. The glass laden mold is inserted into the kiln while the mold is supported on the carriage 23 near the geometric center of the kiln. The latter is heated slowly (about 4 hours) to a soaking temperature of approximately 1000° F. (540° C.) and held at that soaking temperature for approximately one hour. The temperature is raised to 1050° F. (565° C.) for about 30 minutes and during this latter period only, a voltage of 220 volts D.C. supplies 21 amperes to 4 rows of series connected resistance coils (100 coils to a row) of #12 nichrome wire turned on ½ inch (12.7 mm) rods supported 6 inches (15 cm) above the glass to irradiate an area approximately 6 inches (15 cm) wide and 39 inches (99 cm) long for 30 minutes. This is sufficient time for the glass to develop a modified cylindrical bend having a maximum depth of bend of 5 inches (13 cm).

The bent glass sheets are then transferred and excess glass is trimmed from around the margin, if needed. The preliminarily shaped glass sheets are then supported by the flexible fiber glass blanket 64 to form a cradle with the margin of the blanket folded around the edge of the glass sheets and the frame-like ring 66 superimposed over the folded marginal portion of the blanket with its lower serrated edge 67 resting against the tightly wound blanket 64. The marginal edge portion is reversely wrapped over the ring 66 to form the ring assembly. The latter is inserted into the box-like member 46 and the latter moved to a position at approximately the geometric center of the kiln. The kiln temperature is gradually raised at a rate of about 250° F. per hour until the kiln temperature reaches 1150° F. (621° C.). It is then held at that temperature for thirty minutes after which the roof 72 is lowered over the box-like member 46 to form an enclosed chamber. Air pressure of 6½ ounces per square inch (2800 Pascals) is applied for five minutes starting with air heated within the kiln. When newly added air becomes too cool or when the pointer indicates that the cross sag is completed, the air pressure is stopped. The roof of the blow forming tool is raised for ten minutes with the heat continuing in case five minutes is insufficient to complete the cross bend. After ten minutes the roof is lowered once again and 6½ ounces per square inch (2800 Pascals) of air pressure is applied for an additional five minutes or until such time as the pointer 96 begins to move to indicate that the glass heat sagged the necessary amount. The kiln temperature is kept constant during this period of pressure application so that the glass sheets are relieved from stresses during the final shaping by blow forming. However, to insure that the glass can be cut to outline after said final shaping by blow forming (which includes a cross-sag of 3 inches (7.6 cm), the kiln temperature is maintained at 1150° F. (621° C.) for five additional minutes before beginning an annealing cycle during which the glass is cooled within the kiln at an approximate rate of 100° F. per hour (1° C. per minute) until the glass is sufficiently cool for handling.

Shaped glass sheets to be used as press polishing molds are ready for such use to press polish acrylic or polycarbonate sheets. Shaped glass sheets to be included in laminated aircraft windows are free to be cut to their ultimate outline, which for the Cessna 421 are of non-rectangular outline and have a maximum width of 34 inches (86 cm) and a maximum length of 35 inches (89 cm).

The present invention provides a novel method of shaping glass sheets to compound shapes wherein the sheets are preliminarily bent to a first shape of modified cylindrical configuration with little cross sag by sag bending onto an outline mold at a temperature sufficient to deform the glass but below the devitrification temperature, while supported on the outline mold near the geometric center of a kiln. The preliminarily bent glass is then cradled in a fiber glass blanket and mounted over a continuous shaping surface of compound curvature of a box-like element of a blow forming tool. The box-like element is brought to the geometric center of the kiln where the cradle of glass and figer glass with a shaped outline metal frame member thereover is heated to an elevated temperature below the devitrification temperature where air is applied at low pressure to conform the lower surface of the glass to the upward facing shaping surface of the box-like element until the cross-bend is completed either continuously for up to five minutes or intermittently.

The form of this invention shown and described in this disclosure represents an illustrative preferred embodiment thereof. It is understood that various changes may be made without departing from the gist of the invention as defined by the claimed subject matter that follows.

We claim:
1. A method of shaping at least two glass sheets to a complicated shape comprising:
(a) preliminarily shaping said glass sheets to a preliminary shape about a single axis of bending by
  (1) supporting said at least two glass sheets over an upward facing shaping surface of an outline shaping mold,
  (2) heating said glass sheets to the glass deformation temperature until said sheets sag to form an assembly having a prebent shape conforming to said upward facing shaping surface,
  (3) cradling said assembly of prebent glass sheets in a thin flexible blanket of fiber glass cloth with the peripheral edge of the blanket wrapped over the edge of said assembly,
  (4) applying a frame-like ring to the portion of said blanket wrapped over the edge of said assembly to hold said blanket taut against said assembly and reversely folding said fiber glass cloth blanket around said ring to form a ring assembly,
  (5) positioning the ring assembly so formed over a shaping surface of compound shape of a blow forming tool,
  (6) heating the ring assembly so formed to the glass deformation temperature while mounted over said shaping surface,
  (7) enclosing said blow forming tool to form a sealed chamber containing said ring assembly, and
  (8) pressurizing said sealed chamber at a low positive pressure while maintaining said deformation temperature until said glass sheets conform to said shaping surface of said blow forming tool.

2. The method as in claim 1, wherein said at least two glass sheets are exposed for a relatively brief period to a radiant heat source of greater intensity than the general heat facing an elongated area thereof to sag said sheets along a line of sharp bending during the formation of said prebent shape.

3. The method as in claim 1, or claim 2, wherein said low positive pressure in said sealed chamber is increased and decreased intermittently.

4. The method as in claim 3, wherein said chamber is unsealed during some at least of said pressure decreases and resealed during at least some of said pressure increases.

5. The method as in claim 3, wherein said chamber remains sealed throughout said intermittent increases and decreases of low applied pressure.

6. A method of shaping glass sheets by blow forming comprising cradling an assembly of at least two glass sheets to be shaped in a flexible blanket of fiber glass cloth, wrapping the periphery of said cloth around the marginal edge of said assembly, applying a frame-like ring over the folded portion of said fiber glass cloth blanket resting on the upper surface of the upper glass sheet of said assembly, reversely folding said fiber glass cloth blanket around said frame-like ring to form a ring assembly, mounting said assembly so formed above an upward facing shaping surface of a blow forming tool, heating said ring assembly so formed and so mounted to the glass deformation temperature, but below the devitrification temperature of the glass while mounted over said shaping surface, enclosing said blow forming tool to form a sealed chamber containing said ring assembly, and pressurizing said sealed chamber at a low positive pressure while maintaining said deformation temperature until said glass sheets conform to said shaping surface of said blow forming tool.

7. A method as in claim 6, wherein said low positive pressure in said sealed chamber is increased and decreased intermittently.

8. A method as in claim 7, wherein said chamber is unsealed during at least some of said pressure decreases and resealed during at least some of said pressure increases.

9. A method as in claim 7, wherein said chamber remains sealed throughout said intermittent increases and decreases of low positive pressure.

* * * * *